United States Patent [19]
Gotto

[11] Patent Number: 4,656,551
[45] Date of Patent: Apr. 7, 1987

[54] SAFETY ARRANGEMENT FOR CASSETTE RECORDERS AND/OR PLAYBACK APPARATUS

[76] Inventor: Raymond J. Gotto, Eugeniavägen 41, S-113 33 Stockholm, Sweden

[21] Appl. No.: 731,054

[22] Filed: May 6, 1985

[30] Foreign Application Priority Data

May 16, 1984 [SE] Sweden .............................. 8402635

[51] Int. Cl.⁴ ............................................ E05B 73/00
[52] U.S. Cl. ........................................ 360/137; 70/14; 70/190
[58] Field of Search ................ 360/132, 137; 242/198, 242/199; 70/14, 190

[56] References Cited

U.S. PATENT DOCUMENTS

| | | | |
|---|---|---|---|
| 1,441,866 | 1/1923 | McKinney | 70/190 |
| 4,056,834 | 1/1977 | Hiroyasu | 360/132 |
| 4,131,001 | 12/1978 | Gotto | 70/14 |
| 4,188,648 | 2/1980 | Guerini | 360/105 |
| 4,532,566 | 7/1985 | Horimoto | 360/132 |
| 4,563,673 | 1/1986 | Fechner | 360/132 |

FOREIGN PATENT DOCUMENTS 2138778 10/1984 United Kingdom ................ 360/137

*Primary Examiner*—A. Michael Chambers
*Attorney, Agent, or Firm*—Kane, Dalsimer, Sullivan, Kurucz, Levy, Eisele & Richard

[57] ABSTRACT

The invention relates to an arrrangement for preventing unauthorized use of a playback apparatus (10,32) such as a cassette-player or a video reproduction device including a dummy cassette (12,13 and 40,41) intended for insertion into a slot or like opening of the playback apparatus (10,32), the dummy cassette including an externally operable mechanism which is arranged in the cavity between the casing parts of the dummy cassette and which is arranged, with the aid of transmission means, to transfer movement to lock means which co-act with the playback apparatus in a manner such that when the lock means occupies a given position the playback apparatus and the dummy cassette form an inseparable unit. The arrangement is characterized in that the transmission means (15,16,17,20 and 33,35,37,38,39) are operative in causing sleeves (18', 19' and 38', 39') to move from a passive or inactive position within the dummy cassette through openings located in a casing part associated with the dummy cassette to an active position in which the sleeves embrace the drive shafts of the playback device.

3 Claims, 4 Drawing Figures

SAFETY ARRANGEMENT FOR CASSETTE RECORDERS AND/OR PLAYBACK APPARATUS

The present invention relates to a safety arrangement for preventing unauthorized use of cassette recording and/or playback apparatus, such as an audio-cassette player or a video recorder and/or reproduction device, having a slot or opening into which a dummy cassette is inserted. The safety arrangement has the form of a dummy cassette adapted for insertion into the audio-cassette player or video machine, for example when said player or said machine is to be left unattended e.g. in a public place, and is operative to serve as a deterrent against the theft of the player or the machine, as will be apparent from the following. The dummy cassette comprises a casing having arranged between its top and bottom walls an externally operable mechanism which co-acts with movement transmission means arranged within the dummy cassette and operable to activate locking means to a position in which the cassette recording and/or playback apparatus and the dummy cassette form an inseparable unit.

An arrangement of this kind is known from SE No. 7512869-4 (U.S. Pat. No. 4,131,001, issued 12/26/78). The principle of inserting a cassette-like device or dummy cassette into a cassette playback apparatus and locking the dummy cassette therein by means of locking means intended herefor renders the playback apparatus less attractive to a potential thief, since the apparatus is virtually useless until the dummy cassette is removed therefrom. One drawback with all of the solutions proposed in this publication is that the tolerances of the dummy cassette are not related to the standard dimensions of a recording and/or playback apparatus intended for sound and/or video, thereby excluding the practical application of these solutions. Neither can the known arrangement be adapted to the various types of recording and playback apparatus available on the market, and furthermore the locking mechanisms illustrated and described in the aforesaid publication are of such nature as to cause damage to the recording and playback apparatus upon presumptive use.

An object of the present invention is to provide with a starting point from the known technique an arrangement which can readily be produced and which requires relatively little or no service and the function of which fulfils all safety requirements, and which can also be used in conjuction with practically all types of recording and/or playback apparatus available on the market.

The invention is characterized in that the transmission means is adapted to activate sleeve-like members in a manner to cause said sleeve-like members to move from a passive or inactive position within the dummy cassette through openings arranged in a casing part of said device and to embrace the drive shafts of the recording and/or playback apparatus.

The invention will now be described in more detail with reference to two embodiments thereof illustrated in the accompanying drawing.

Figure 1:
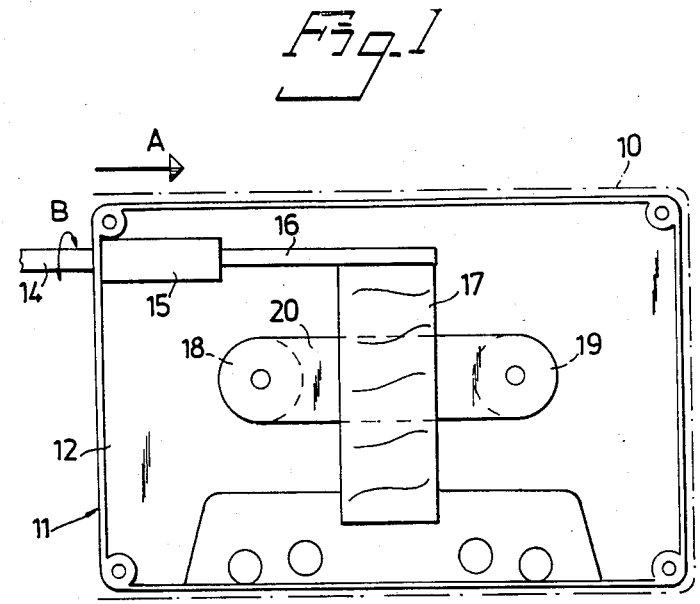
FIG. 1 is a plan view of a first embodiment of an arrangement according to the invention, including a dummy cassette, one casing side of which has been removed.

For the sake of simplicity the invention will be described hereinafter with reference to a playback apparatus, although it will be understood that such apparatus also include sound and/or picture recording and reproduction devices. The structural design and operational mode of such apparatus are well known and will not therefore be described in detail.

The reference 10 identifies a conventional playback apparatus, which may have the form of a cassette player which may be portable or intended as a permanent fixture in an automotive vehicle or boat and intended for reproducing and optionally recording sound. The playback apparatus may also be a video-tape reproduction apparatus of known kind. Inserted in the playback apparatus is an elongated rectangular dummy cassette 11 made of a robust sheet material and inserted into the apparatus in the direction of arrow A. The dummy cassette 11 according to FIGS. 1 and 2 has an external shape and dimensions fully corresponding to a conventional cassette and thus includes two separable cassette halves 12 and 13 which define therebetween a cavity which, in the case of a conventional sound cassette, for example, would accommodate a sound tape and its driveable shafts. The dummy cassette-like casing half 12 exhibits two recesses 18,19 arranged sequentially in the longitudinal direction, and a plate 20 arranged between the openings and covering the same.

As will be seen in FIGS. 1 and 2, in accordance with the invention a key or some other activating means 14 can be inserted into a lock cylinder 15 of known kind which, upon rotation of the key 14, synchronously rotates a shaft 16 forming an extension of the lock cylinder 15 and operatively co-acting therewith. The free end of the shaft 16 is connected with one end of an arcuate or bowed elongate element 17 which extends transversely to the shaft 16 and the other end of which is seated firmly on the bottom of the casing half 12 of the dummy cassette 11, either directly or indirectly. The elongate element 17 is arranged to lie above the plate 20 and will normally exhibit some degree of slack, which can be taken-up, however, when the key 14 is turned, as described hereinafter.

Figure 2A:
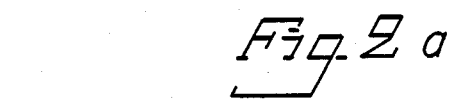
FIG. 2 illustrates an activating mechanism in three sectional part views A–C.
Figure 2A:
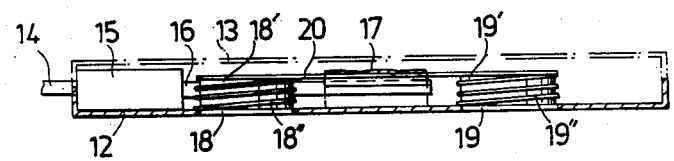

The openings 18,19 in the cassette half 12 of the dummy cassette are arranged to accommodate movable sleeve-like members 18' and 19' respectively which when occupying their inactive position extend completely through or substantially completely through the space formed between the cassette halves 11,12. These sleeve-like members 18', 19' are biased by a spring 18", 19" in a manner such that the said members normally strive to abut the undersurface of the plate 20, for example as illustrated in FIG. 2a. Thus, it is conceivable in practice for one end of the respective springs 18", 19" to be firmly connected to the undersurface of the plate 20 and the other ends of respective springs connected to respective sleeve-like members 18' and 19' movable through respective openings 18, 19. In this respect, the spring 18", 19" may have the form of a thrust spring which endeavours to take the passive position illustrated in FIG. 2a, in which the lower edge of the sleeve-like member 18', 19' is flush with or substantially flush with the undersurface of the cassette half 12. The sleeve-like members are thus oriented in the space between the cassette halves 12,13 as illustrated in FIG. 2a.

Figure 2B:
Figure 2B:
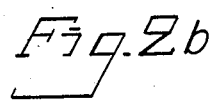
Figure 2C:
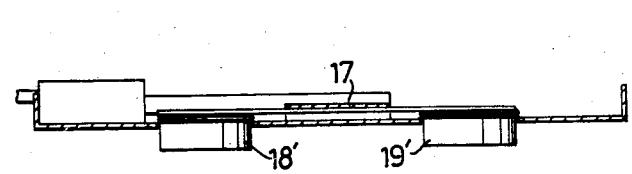
Figure 2C:
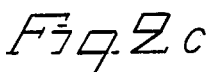

In practice the aforedescribed arrangement has the following operational mode. The dummy cassette is inserted into the playback apparatus, e.g. a cassette sound and/or video recorder/playback device, in a conventional manner, whereafter the key or like lock-activating means 14 is placed in the lock cylinder 15. When the key 14 is turned in the direction of arrow B, the shaft 16 is also turned in the same direction and the elongated element 17 is stretched or tensioned thereby to press down the plate 20. Because the plate 20 in the position shown in FIG. 2a is located in a somewhat higher plane than the two attachment points of the elongate element 17 (as beforementioned the elongate element is bowed) further rotation of the key 14 will cause the plate 20 to be urged downwardly against the actions of springs 18", 19" dogging therewith the movable sleeve-like members 18', 19' (FIG. 2b). When occupying an active terminal position (FIG. 2c) the sleeve-like members 18', 19' embrace the drive shafts (not shown) of the playback apparatus. With the sleeve-like members in this active terminal position (FIG. 2c) the lock mechanism in the cylinder 15 is activated in a known manner such that the shaft 16 is held in the position to which it is rotated (FIG. 2c), whereafter the key 14 is withdrawn from the lock cylinder and the dummy cassette is therewith firmly locked to the playback apparatus, which as beforementioned may be a cassette player or video reproduction device.

The device described with reference to and illustrated in FIGS. 1 and 2 can thus be used with the majority of cassette players and video reproduction devices available at present on the market. The simple construction requires but little or no service.

Figure 3:
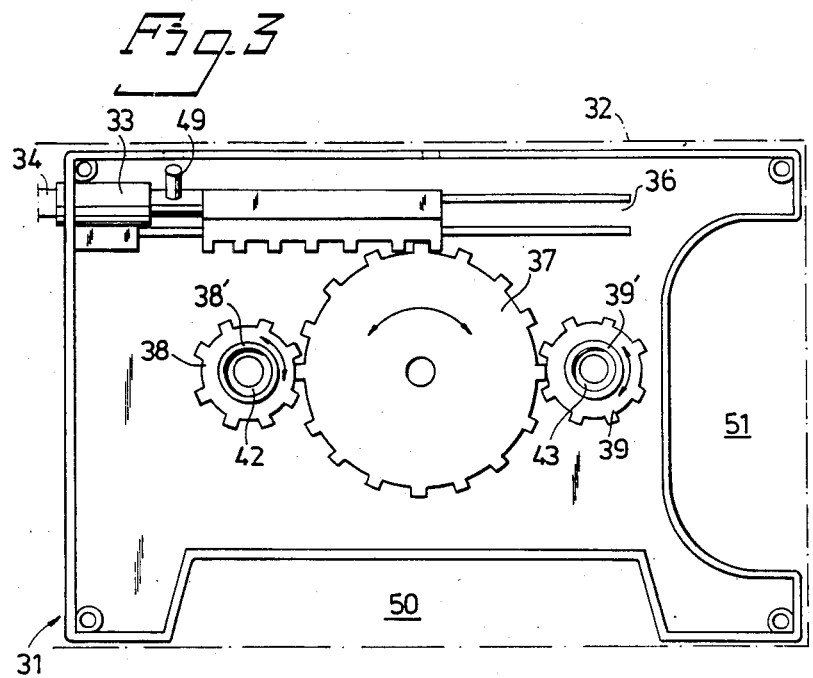
FIG. 3 is a plan view of a second embodiment of the invention including a dummy cassette with one casing side removed.
Figure 4:
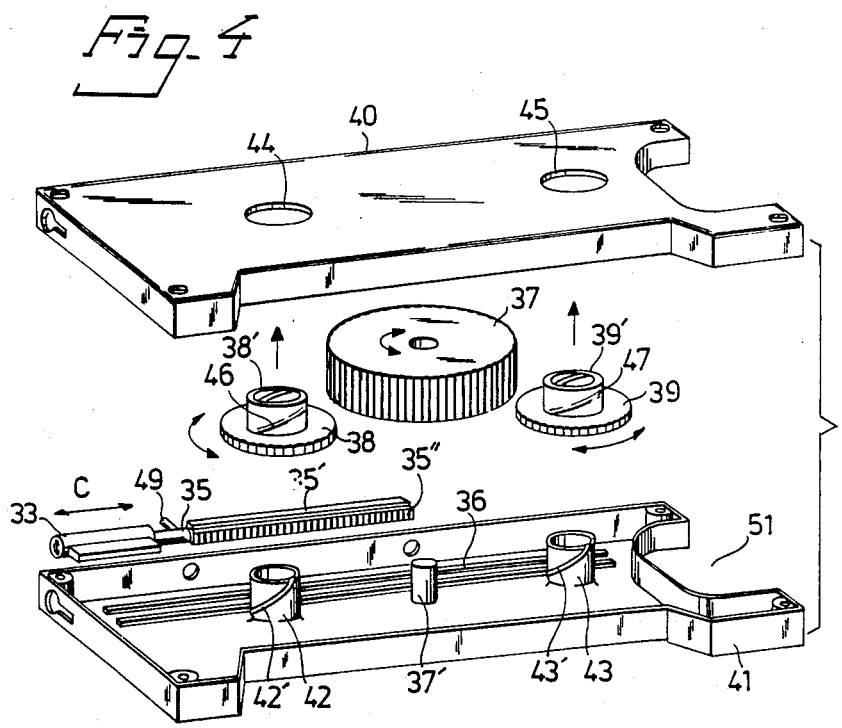
FIG. 4 is an exploded view of the arrangement according to FIG. 3.

The playback device locking arrangement illustrated in FIG. 3 and in the exploded view of FIG. 4 has principally the same operational mode as that illustrated in FIGS. 1 and 2, but differs constructionally from the FIGS. 1 and 2 embodiment insofar as the FIGS. 3 and 4 locking arrangement is intended for playback apparatus of the kind in which the whole of the cassette in an active playback position is oriented within the playback apparatus, wherein one or more edge portions of the cassette may be arranged to activate switch means for switching the apparatus to the playback mode.

The locking arrangement illustrated in FIGS. 3 and 4 has a thickness corresponding to a conventional cassette. The outer shape, however, differs from that of a conventional cassette, for reasons hereinafter made apparent.

The dummy cassette 31 can be inserted into a playback apparatus, shown in chain lines at 32, in the direction of the arrow as beforedescribed, and comprises two mutually connectable elongate rectangular casing parts 40,41, which define a cavity therebetween. Arranged in the cavity between the casing parts 40,41 is a lock cylinder 33 which is adapted to co-act with an activating means or key, indicated at 34. The whole of the lock cylinder is located within said cavity and communicates with the outer side of the casing 31 through the keyhole located on the short side of the casing. The lock cylinder 33 merges with a rotatable shaft 35 inserted in a hollow cylindrical elongated rack member 35' having teeth 35" arranged along the whole of its length on the outer surface thereof. The shaft 35, and thus also the lock cylinder part 33, is held against displacement relative to the rack element 35'. The lock cylinder 33, the shaft 35 and the rack element 35' therewith form an assembly which can be moved axially backwards and forwards in the direction of the arrow C (FIG. 4). Thus, this assembly can be moved axially along a path 36 with the aid of the key 34, the teeth 35" on the rack element being adapted to co-act with corresponding teeth on a centrally arranged toothed wheel or cog 37 arranged for rotation on a shaft 37'.

Arranged on both sides of the cog wheel 37 and in driving connection therewith is a respective toothed wheel or cog 38 and 39 firmly mounted on one end of an associated sleeve 38', 39'. The sleeves 38', 39' with associated cog wheel 38, 39 are arranged in one position to embrace upstanding cylindrical pegs 42, 43 arranged on the bottom of the casing part 41, each of the pegs presenting a respective helical groove 42', 43'. The height of the teeth on the cog wheel 37 corresponds substantially to the height of the pegs 42,43, while the height of the teeth on the laterally placed cog wheels 38,39 are considerably shorter. The sleeves 38' and 39' accommodating respective cog wheels 38,39 are provided with an internal bead or like raised portion, indicated at 46 and 47, having a configuration corresponding to the configuration of the helical grooves 42', 43'.

The cassette casing part 40 presents two through openings 44, 45 arranged in the same vertical plane as the stationary pegs 42, 43.

When the dummy cassette 31 is inserted into the playback apparatus 32, the elements 33, 35 and 35' are displaced with the aid of the key or activating means 34 along the path 36. As will be seen from FIG. 3, this results in simultaneous rotation of the cog wheel 37. This rotary movement is transferred to the two laterally located thinner cog wheels 38,39, wherewith the guide means 46, 47 and 42', 43' respectively urge the cog wheels 38 and 39 upwardly along the central cog wheel 37, wherewith the sleeves 38', 39' connected with respective cog wheels 38, 39 are guided out through the openings 44 and 45 respectively in the second casing part 40 and caused to embrace the drive shafts of the playback apparatus. For the purpose of holding the dummy cassette in this active position, there is arranged on a free part of the shaft 35 between the lock cylinder 33 and the rack part 35' a pin 49 which, when the activating means 34 and therewith also the shaft 35 are rotated, is arranged to engage in a recess 49'. The lock mechanism 33 of this embodiment is also arranged to be locked in the aforedescribed active position in a known manner, it being necessary to have access to the activating menas 34 in order to release the lock.

The lock arrangement illustrates in FIGS. 3 and 4 also includes a laterally arranged recess 50 intended when using the aforementioned type of playback apparatus for sound cassettes to eliminate drive release of the playback apparatus. The recess 51 is intended for eliminating the re-coupling means of the playback apparatus.

The aforedescribed and illustrated embodiments represent practical examples of the inventive concept thus the concept of providing a dummy cassette with means which cause sleeve-like members to co-act in a locking manner with the drive shafts of the playback apparatus, therewith causing the playback apparatus and the dummy cassette to form an assembly or unit which can only be released with the aid of an activating means intended therefor.

As will be understood by those skilled in this art, the aforedescribed arrangement can also be combined with an alarm system in some suitable manner.

The dummy cassette is suitably made of metal, which will contribute toward preventing damage to the playback apparatus.

I claim:

1. A device for preventing unauthorized use of a cassette or video tape recorder or player comprising a hollow body having a substantially flat rectangular outer casing corresponding in size and shape to a standard tape or video cassette and locking means associated with said body for locking said body in a cassette opening of a cassette or video tape recorder or player having drive shafts, each of which drive shafts has a projecting end, said locking means comprising a lock opening in said casing, a rotary lock cylinder having a keyhole accessible from the exterior of said casing through said locking, two sleeve-like members connected to a spring-biased plate and adapted to fit over said projecting ends of said drive shafts, and transmission means within said casing connected between said lock cylinder and said sleeve-like members, said transmission means converting movement of said cylinder into projecting and retracting movements of said sleeve-like members with respect to said projecting ends of said drive shafts.

2. A device for preventing unauthorized use of a cassette or video tape recorder or player comprising a hollow body having a substantially flat rectangular outer casing corresponding in size and shape to a standard tape or video cassette and locking means associated with said body for locking said body in a cassette opening of a cassette or video tape recorder or player having drive shafts, each of which drive shafts has a projecting end, said locking means comprising a lock opening in said casing, a rotary lock cylinder having a keyhole accessible from the exterior or said casing through said lock opening, two sleeve-like members adapted to fit over said projecting ends of said drive shafts, said sleeve-like membes each having an inner and outer surface, the outer surfaces of which each comprise a cog when having projections thereon and the inner surfaces of which each have a helical groove, cylindrical pegs projecting from said casing and adapted to fit within said sleeve-like members, each of said pegs having a helical projection thereon corresponding to said helical grooves, and transmission means within said casing connected between said lock cylinder and said sleeve-like members and comprising a cog wheel having projections which engage said projections on said cog wheels on said sleeve-like members, said transmission means converting movement of said cylinder into projecting and retracting movements of said sleeve-like members with respect to said projecting ends of said drive shafts.

3. The device of claim 2 which has one or more recesses or cut-outs which defeat operation of a release function of a playback apparatus of the cassette or video tape recorder.

* * * * *

UNITED STATES PATENT AND TRADEMARK OFFICE
CERTIFICATE OF CORRECTION

PATENT NO. : 4,656,551

DATED : April 7, 1987

INVENTOR(S) : RAYMOND J. GOTTO

It is certified that error appears in the above-identified patent and that said Letters Patent is hereby corrected as shown below:

Column 6, line 11, Claim 2, "when" should read — wheel —.

Signed and Sealed this

Twenty-fifth Day of August, 1987

Attest:

DONALD J. QUIGG

Attesting Officer

Commissioner of Patents and Trademarks